CONTROLLED-RECTIFIER SYSTEMS

Original Filed Dec. 31, 1962 2 Sheets-Sheet 1

CONTROLLED-RECTIFIER SYSTEMS

Original Filed Dec. 31, 1962 2 Sheets-Sheet 2

United States Patent Office

Re. 26,701
Reissued Oct. 28, 1969

26,701
CONTROLLED-RECTIFIER SYSTEMS

Robert W. Spink, Wauwatosa, Wis., assignor to Cutler-Hammer, Inc., Milwaukee, Wis., a corporation of Delaware Original No. 3,281,645, dated Oct. 25, 1966, Ser. No. 248,314, Dec. 31, 1962. Application for reissue Jan. 23, 1968, Ser. No. 702,145
Int. Cl. H02m *7/44, 7/68*
U.S. Cl. 321—5 19 Claims

Matter enclosed in heavy brackets [ ] appears in the original patent but forms no part of this reissue specification; matter printed in italics indicates the additions made by reissue.

*ABSTRACT OF THE DISCLOSURE*

*A three-phase solid state rectifier bridge system supplied from a three-phase A.C. source for controlling a D.C. load and including series-connected controlled rectifiers in the bridge circuit and firing circuits phase-synchronized with their anode voltages to apply simultaneous fast rise time firing pulses thereto and to render such system insensitive to line phase rotation. Transistor switching circuits limit firing pulses to positive anode voltage half-cycles and RC voltage stretchers afford full 180 degree firing.*

*Cross-reference to related application*

*My reissue application Ser. No. 702,144, filed Jan. 23, 1968, is a division hereof.*

*Background of the invention*

This invention relates to controlled-rectifier systems and more particularly to firing control circuits for controlled-rectifiers.

While not limited thereto, the invention is especially applicable to a three-phase rectifier bridge network supplying an inductive direct current load and having controlled-rectifiers in series connection in certain branches of such bridge network to provide simultaneous very fast rise time and narrow width gate pulses successfully to fire series-connected controlled-rectifiers within damaging voltage transient limitations and to prevent damaging the controlled-rectifiers by gating thereof while load counter-voltage is being applied reversely thereto.

*Summary of the invention*

An object of the invention is to provide an improved controlled-rectifier system.

A more specific object of the invention is to provide improved firing control circuits for controlled-rectifier networks.

Another specific object of the invention is to provide improved fast-firing control circuits for plural-phase controlled-rectifier [brige] *bridge* networks.

Other objects and advantages of the invention will hereinafter appear.

According to the invention, there is provided a three-phase rectifier bridge network energized from a three-phase alternating current power supply source and being controllable to supply adjustable unidirectional electrical energy to a direct current load device such as the armature winding of a direct current motor. The rectifier bridge network is of the static solid element type. While the arrangement of solid elements in the rectifier network may take various forms, it is preferably of the type having at least two series-connected controlled-rectifiers in each of three branches and having one or more diodes in each of the other three branches thereof. Each of these controlled-rectifiers is provided with an anode and a cathode forming a main current conduction path therethrough and a gate forming with the cathode a control current conduction path whereby the firing point of the controlled-rectifier is controlled. While controlled-rectifier firing control circuits have been known heretofore, these known circuits have the disadvantages that they permit time lag in the firing of one series-connected controlled-rectifier relative to the firing of the other, and the firing pulse increases leakage current when reverse voltage is applied. A feature of the invention resides in the provision of firing control circuits which overcome such disadvantage by affording simultaneous very fast rise time narrow width gate pulses whereby simultaneously to fire series-connected controlled-rectifiers. Three such firing control circuits are provided for three respective branches of the rectifier bridge. These firing control circuits are supplied from a common voltage source and their input control terminals are connected together in parallel. Each such firing control circuit comprises a very fast acting pilot controlled-rectifier which, when fired, energizes a pulse transformer. The latter is provided with a plurality of secondary windings connected to apply steep wave front and very short time firing pulses to the gate-cathode junctions of the respective series controlled-rectifiers. An input transistor provides capacitor charging current proportional to the input control voltage which in turn controls a unijunction transistor to trigger the pilot controlled-rectifier. A switching transistor is employed to establish the charging intervals of the integrating capacitor. The switching transistor is provided with a delay circuit or RC circuit to stretch its cutoff period a minimum of 30 electrical degrees whereby to afford firing control to the extreme end of the 240 electrical degree period during which forward voltage is applied to the series controlled-rectifiers. A three-phase transformer is provided to synchronize the switching transistor control voltage wave with the forward voltage wave applied to the series controlled-rectifiers. Other features of the invention reside in the incorporation of means to render the system insensitive to circuit transients, to line voltage disturbances, and to line phase rotation; to afford high gain at low output, to afford low power consumption, to afford constant amplitude firing pulses over a complete 180 electrical degree control range, to afford simultaneous one microsecond rise time pulses to the series controlled-rectifiers and to electrically isolate the input signal from the power supply lines and the rectifier network.

*Brief description of the drawings*

These and other objects and advantages of the invention and the manner of obtaining them will best be understood by reference to the following detailed description of an embodiment of the invention taken in conjunction with the accompanying drawings, wherein.

*Description of the preferred embodiment*

Figure 1:
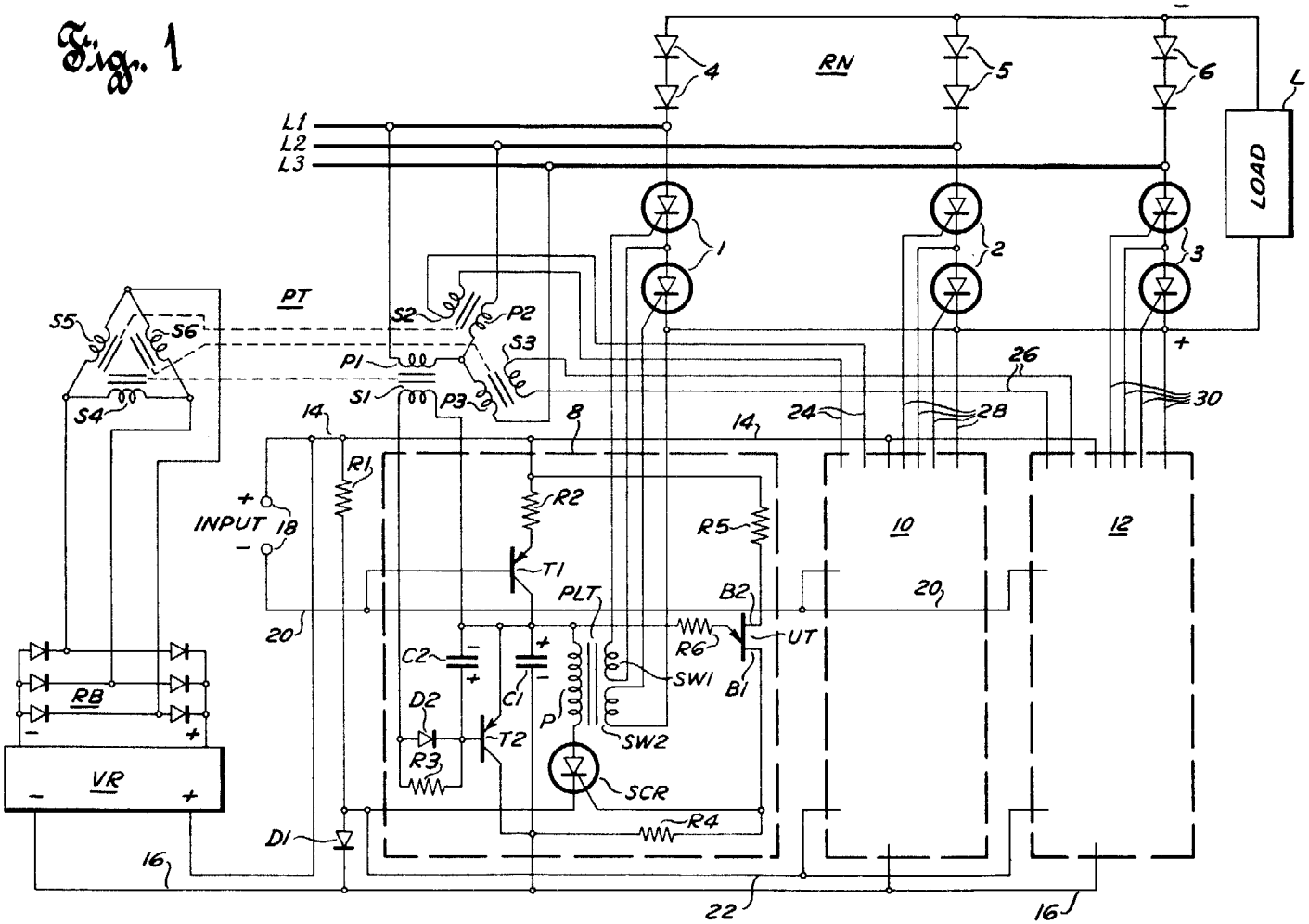
FIGURE 1 diagrammatically depicts a controlled-rectifier system and firing control circuits therefor constructed in accordance with the invention.

Referring to FIG. 1, there are shown power supply line L1, L2 and L3 supplied from a three-phase alternating current power supply source and being connected to the three input terminals of a three-phase rectifier bridge network indicated generally as RN. The positive and negative output terminals of network RN are connected across a direct current load device L. The input terminals to which lines L1, L2 and L3 are connected are in turn connected through gating type power controlling devices such as pairs of controlled-rectifiers 1, 2 and 3, respectively, to the positive output terminal of network RN. The negative output terminal of network RN is connected through pairs of unidirectionally conducting diodes 4, 5 and 6 to the input terminals to which respective lines L1, L2 and L3 are connected.

Three firing control circuits 8, 10 and 12 are provided for pairs of controlled-rectifiers 1, 2 and 3, respectively. Since firing control circuits 10 and 12 are identical to firing control circuit 8, only the latter has been shown in detail to avoid complicating the drawing.

A group of three transformers PT is provided to afford supply and control voltage to the three firing control circuits. Transformers PT are provided with a set of primary windings and two sets of secondary windings. Primary windings P1, P2 and P3 are connected in star relation such that first ends thereof are connected to a common neutral point and the other ends thereof are connected to lines L1, L2 and L3, respectively. The first set of secondary windings S1, S2 and S3 are magnetically coupled to primary windings P1, P2 and P3, respectively, and are individually connected to firing control circuits 8, 10 and 12, respectively, to supply synchronized control voltages thereto as hereinafter more fully described. The second set of secondary windings S4, S5 and S6 are connected to one another in delta relation and are magnetically coupled to primary windings P1, P2 and P3, respectively. These delta-connected secondary windings serve to stabilize the neutral connection of the primary windings and thereby prevent distortion of the voltage sine waves induced in the first set of secondary windings S1, S2 and S3. The three junctions of secondary windings S4, S5 and S6 are connected, respectively, to the three input terminals of a three-phase rectifier bridge RB. The positive and negative output terminals of the latter are connected to a voltage regulator VR. The positive and negative output terminals of the voltage regulator are connected to common supply conductors 14 and 16, respectively, whereby to supply regulated unidirectional operating voltage to the three firing control circuits.

A pair of input terminals 18 are provided for applying a direct current input signal to the three firing control circuits. The positive input terminal is connected to common conductor 14 and the negative input terminal is connected to a common conductor 20 which is connected to the three firing control circuits in parallel. A resistor R1 and a unidirectional current conducting diode D1 are connected in series in that order from conductor 14 to conductor 16. The junction of resistor R1 and diode D1 is connected in parallel to firing control circuits 8, 10 and 12 for purposes hereinafter described.

Firing control circuit 8 is provided with means for developing a linearly increasing triggering voltage. This means comprises a constant current conducting semiconductor device such as an input transistor T1 for controlling current flow to an electrical energy storage device such as a capacitor C1. Transistor T1 is of the P-N-P type and its emitter is connected through a resistor R2 to conductor 14 and through the latter to the positive input voltage terminal. The base of transistor T1 is connected to conductor 20 and through the latter to the negative input voltage terminal. The collector of transistor T1 is connected through capacitor C1 to common conductor 16 and through the latter to the negative output terminal of voltage regulator VR.

Firing control circuit 8 is also provided with switching means for determining the charging periods of capacitor C1 in synchronism with the periods during which forward voltage is applied from the power supply lines to controlled rectifiers 1 in the associated branch of rectifier bridge network RN. This means comprises a switching or resetting transistor T2 of the P-N-P type having its emitter connected to the junction between capacitor C1 and the collector of transistor T1 and having its collector connected to the other side of capacitor C1. This means also comprises a control voltage source for transistor T2 including primary winding P1 connected between power supply line L1 and the transformer neutral point and secondary winding S1 coupled to primary winding P1. Secondary winding S1 provides a 180 degree voltage half-cycle in synchronism with the 240 degree forward voltage applied to controlled rectifiers 1, as hereinafter more fully described, and because its phase relationship is such that its positive voltage starts 30 degrees after the start of the forward voltage and terminates 30 degrees before the end of the forward voltage, the system is insensitive to phase rotation. Because this positive voltage starts 30 degrees ahead of the earliest needed firing pulse for maximum output, complete required 180 degree firing control can be obtained by stretching the trailing end of this positive voltage half-cycle by 30 more degrees. This stretching means comprises a unidirectional diode D2 and an RC circuit comprising a capacitor C2 and a resistor R3. One end of secondary winding S1 is connected to the emitter of transistor T2 and the other end thereof is connected through diode D2 in its forward, low impedance direction to the base of transistor T2. Resistor R3 is connected across diode D2. Capacitor C2 is connected between the emitter and base of transistor T2.

Firing control circuit 8 is further provided with means for applying firing pulses to the gates of controlled rectifiers 1 and triggering means for such firing pulse applying means under the control of the aforementioned linear voltage developing means.

This firing pulse applying means comprises a very fast acting gating type pilot device or pilot controlled-rectifier SCR and a pulse transformer PLT. Controlled-rectifier SCR may be a silicon controlled-rectifier and may be similar to controlled rectifiers 1, 2 and 3 in network RN except that it is smaller and has a much smaller voltage and current rating. The anode of controlled-rectifier SCR is connected through primary winding P of pulse transformer PLT to the junction between capacitor C1 and the collector of transistor T1. The cathode of controlled-rectifier SCR is connected to the common junction between resistor R1 and diode D1. The gate of controlled-rectifier SCR is connected through a resistor R4 to the junction between capacitor C1 and common conductor 16. Secondary winding SW1 of transformer PLT is connected to the gate and cathode of the first controlled-rectifier of pair 1 thereof and secondary winding SW2 of transformer PLT is connected to the gate and cathode of the second controlled-rectifier of such pair in like manner.

The aforementioned triggering means comprises a unijunction transistor UT arranged to respond to the voltage on capacitor C1 to trigger or fire controlled-rectifier SCR. Base B2 is connected through a resistor R5 to positive voltage conductor 14 and base B1 is connected through the aforementioned resistor R4 to negative voltage conductor 16 whereby to supply regulated inter-base voltage to the unijunction transistor. The junction between capacitor C1 and the collector of transistor T1 is connected through a resistor R6 to the emitter of unijunction transistor UT whereby to apply control voltage to the latter.

Although the details of firing control circuits 10 and 12 have not been shown since they are similar to the details of firing control circuit 8 just described, the external connections thereto are the same as shown in FIG. 1. That is, positive voltage conductor 14 and negative voltage conductor 16 are connected to each of circuits 10 and 12 in the same manner as described in connection with circuit 8. Negative input signal voltage conductor 20 is connected in the same manner to the base of a similar input transistor in each of circuits 10 and 12. The junction between resistor R1 and diode D1 is connected through a conductor 22 to the cathode of a controlled-rectifier similar to controlled-rectifier SCR in each of circuits 10 and 12. Secondary windings S2 and S3 are connected through pairs of conductors 24 and 26 to circuits 10 and 12 in the same manner as secondary winding S1 is connected to circuit 8. Moreover, the pairs of secondary windings of pulse transformers in circuits 10 and 12 similar to pulse transformer PLT in circuit 8 are connected in like manner through sets of four conductors 28 and 30 to pairs 2 and 3 of controlled-rectifiers in the other two controlled branches of bridge network RN, respectively.

Voltage regulator VR shown schematically in the lower left-hand portion of FIG. 1 is provided to afford a D.C. voltage of constant magnitude to common conductors 14 and 16 and through the latter to firing control circuits 8, 10 and 12. Voltage regulators of this type are well known and available on the market. While voltage regulators of this type may take various forms, a preferred type usable in this system is known as the Cutler-Hammer Reference Regulator Module. For example, if three-phase delta-connected secondary windings S4, S5 and S6 provide a voltage such that full-wave rectification thereof by bridge RB provides 37 to 45 volts D.C. to regulator VR, the latter provides 35 volts regulated D.C. to conductors 14 and 16.

A suitable source of input signal voltage may be connected to input terminals 18. This source may consist of any known D.C. voltage source having a selectively and continuously adjustable magnitude sufficient to control current conduction in transistor T1 or may be obtained from voltage regulator VR through a continuously adjustable potentiometer or the like.

Secondary windings SW1 and SW2 of pulse transformer PLT are wound of resistance wire to provide each of these windings with 5 to 6 ohms of resistance which functions to limit the gate currents of controlled rectifiers 1. This secondary resistance is desired because the impedance of controlled rectifier SCR when conducting is very small and, therefore, the circuit of primary winding P does not have enough impedance to limit such gate current when capacitor C1 is discharged therethrough.

Figure 2:
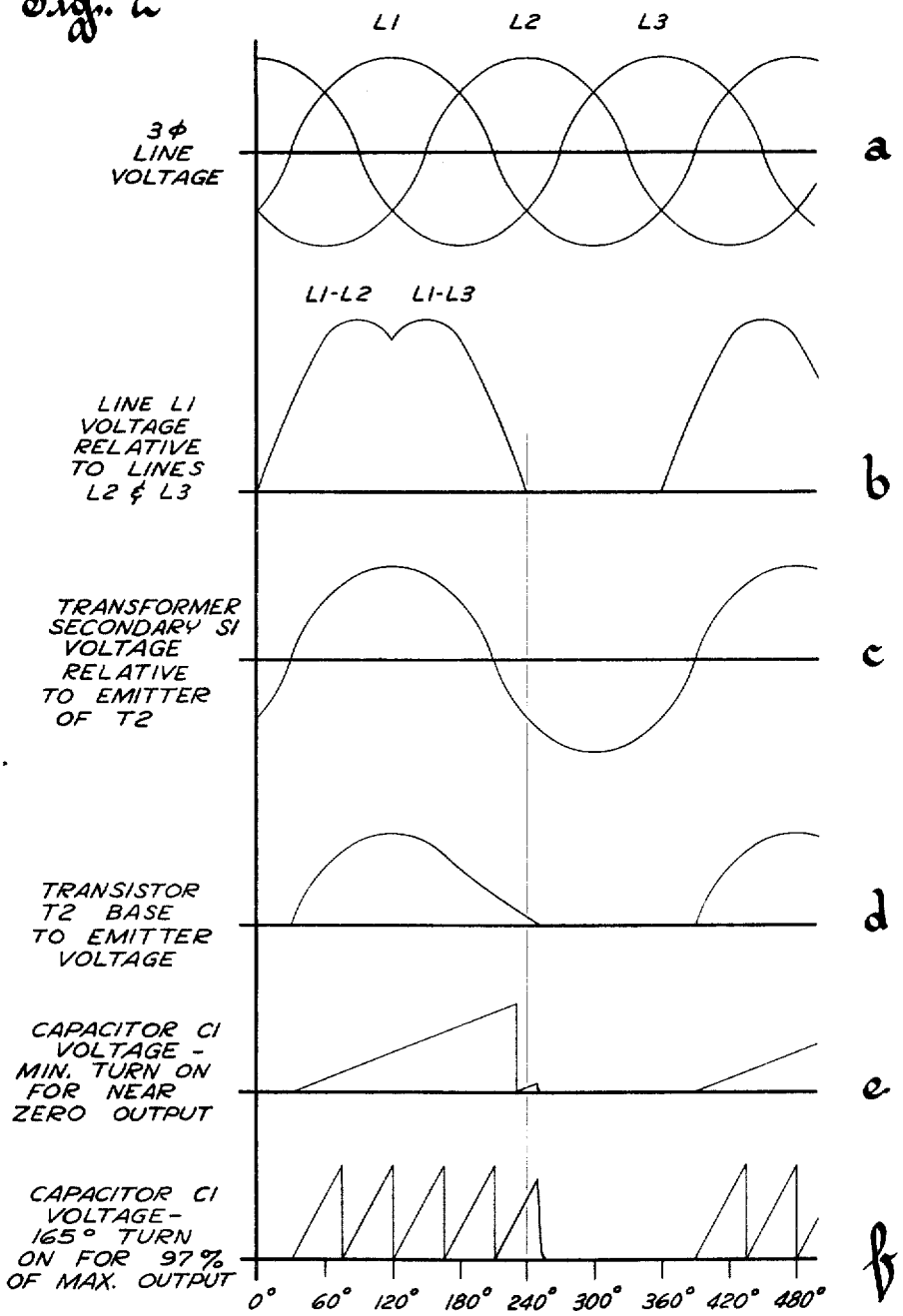
FIG. 2 graphically depicts operating characteristics of the system of FIG. 1.

The operation of the system of FIG. 1 will now be described with reference to the curves in FIG. 2 showing operating characteristics thereof. Since firing control circuits 10 and 12 operate controlled-rectifier pairs 2 and 3 in the same manner as firing control circuit 8 operates controlled-rectifier pair 1, only the latter operation will be described in detail. It will be apparent that, depending on the phase sequence of the A.C. power supply, one order of conduction will be controlled-rectifier pairs 1, 2 and 3 in sequence in that order whereafter the conduction would be similarly repeated. That is, current will flow through controlled-rectifier pair 1 and load L and then first through diodes 5 and then through diodes 6. When controlled-rectifiers 2 are fired next in the sequence, current will flow therethrough and through the load and then first through diodes 6 and then through diodes 4. When controlled-rectifiers 3 are fired last in the sequence, current will flow therethrough and through the load and then first through doides 4 and then through diodes 5. This order of current flow is illustrated in FIGS. 2(a) and (b) wherein line L1 is shown as being first positive relative to line L2 and being then positive relative to line L3. Although not shown in FIG. 2(b) to avoid complicating the curves therein, it is apparent in FIG. 2(a) that line L2 is first positive relative to line L3 and is then positive relative to line L1. Next in sequence, line L3 becomes positive first with respect to line L1 and then becomes positive with respect to line L2. Thereafter this same sequence is repeated.

Referring to FIG. 1, it will be apparent that a forward voltage is applied to controlled-rectifiers 1 for a 240 electrical degree period according to the curve in FIG. 2(b) from lines L1, L2 and L3. The line voltage is also applied to the primary windings of transformers PT. As a result, secondary windings S1, S2 and S3 are energized and a voltage according to the curve shown in FIG. 2(c) is induced in winding S1. Due to the direction in which secondary winding S1 is wound relative to primary winding P1, the voltage developed across secondary winding S1 is in synchronism as shown in FIG. 2(c) with the forward voltage applied to the associated controlled-rectifiers 1 as shown in FIG. 2(b). Due to the star connection of the transformer primary windings, the voltage developed in secondary winding S1 persists before reversal for only 180 electrical degrees, that is, it lags the forward voltage of the associated controlled-rectifiers by 30 degrees and decreases to zero 30 degrees ahead of the forward voltage as shown in FIGS. 2(b) and (c). In other words, the voltage wave in FIG. 2(c) is in phase with the voltage wave L1 in FIG. 2(a). Similar voltages are induced in secondary windings S2 and S3 in synchronism with the forward voltages on controlled-rectifier pairs 2 and 3 respectively, in sequence.

The aforementioned energization of the primary windings of transformers PT also causes energization of the second set of delta-connected secondary windings S4, S5 and S6. As a result, current flows therefrom through rectifier bridge RB to voltage regulator VR. In turn, a regulated D.C. voltage is applied from the positive and negative output terminals of the voltage regulator to conductors 14 and 16. This causes current flow through resistor R1 and diode D1. The forward voltage drop of diode D1 is about one-half volt and is sufficient to nullify any voltage effect on the gate-cathode junction of controlled-rectifier SCR which might be caused by interbase current flow through unijunction transistor UT and resistor R4. That is, any tendency on the part of such interbase current to trigger controlled-rectifier SCR into its conducting state will be offset by the forward voltage drop across diode D1 and the latter will bias the gate of controlled-rectifier SCR slightly negative relative to the cathode thereof to maintain the same non-conducting.

Inter-base voltage for unijunction transistor UT is supplied from conductors 14 and 16 through resistors R5 and R4. Operating voltage is also supplied from conductors 14 and 16 through resistor R2 and capacitor C1 to the emitter-collector junction of transistor T1.

Application of control input voltage to input terminals 18 of the polarity shown thereat renders the base of transistor T1 negative relative to the emitter thereof. As a result, transistor T1 is rendered conducting and current flows from conductor 14 through resistor R2 and the emitter-collector junction of transistor T1. This current then flows either through switching transistor T2 when it is rendered conducting or through capacitor C1 to charge the latter when transistor T2 is rendered non-conducting as hereinafter more fully described.

The aforementioned voltage on transformer secondary winding S1, that is, the positive half-cycle thereof shown in FIG. 2(c) causes current flow through diode D2 in its forward, low impedance direction to charge capacitor C2 to the polarity depicted thereat. This charge on capacitor C2 renders the base of switching transistor T2 positive relative to the emitter thereof to render the switching transistor non-conducting. As a result, instead of flowing through transistor T2, the aforementioned current flowing through input transistor T1 now charges capacitor C1 linearly as shown by the upward slope of the curve in FIG. 2(e). The charging of capacitor C1 is linear because current of constant magnitude flows through input transistor T1. The slope of this charging curve, that is, the charging rate, can be increased by increasing the magnitude of the input signal voltage at terminals 18. This slope can be increased from the minimum shown in FIG. 2(e) past that shown in FIG. 2(f) to a maximum hereinafter described when the system is adjusted to maximum power output to the load.

The charge on capacitor C1 controls application of firing pulses to controller-rectifiers 1. When the voltage on capacitor C1 increases to a predetermined magnitude, for example, 20 volts, which voltage is applied through resistors R6 and R4 to the emitter-base B1 junction of unijunction transistor UT, it renders the unijunction transistor conducting. As a result, capacitor C1 starts to discharge and causes current flow through resistor R6, the emitter-base B1 junction of the unijunction transistor and resistor R4. The voltage drop on resistor R4 is of opposite polarity to the forward voltage drop on diode D1, overcomes such forward voltage drop and renders the gate of controlled-rectifier SCR positive relative to the cathode thereof to cause current flow through the gate-cathode junction and diode D1 to trigger this pilot controlled-rectifier into its conducting state. Capacitor C1 then quickly discharges completely through primary winding P of pulse transformer PLT, the anode-cathode junction of controlled-rectifiers SCR and diode D1. This causes very fast rise time, 1 microsecond, narrow width gate pulses to be applied simultaneously from secondary windings SW1 and SW2 to the gate-cathode junctions of controlled-rectifiers 1. These gate pulses fire the controlled-rectifiers to cause current flow therethrough to load L for the remainder of their 240 electrical degree forward voltage period shown in FIGURE 2(b). These gate pulses have a very fast rise time due to the rapidity with which controlled-rectifier SCR can be triggered, and have a very narrow pulse width or short duration of about 50 micro-seconds due to the rapidity with which controlled-rectifier SCR discharges capacitor C1.

The RC circuit comprising resistor R3 and capacitor C2 is provided to afford adjustment of the firing angle of controlled-rectifiers 1 to the extreme end of their forward voltage wave shown in FIG. 2(b). Since the voltage on transformer secondary winding S1 reverses polarity as shown in FIG. 2(c) 30 degrees before the end of the controlled-rectifier forward voltage shown in FIG. 2(b), this reversal would cause switching transistor T2 to conduct and would terminate charging of capacitor C1 unless some means are provided to modify this action. For this purpose, the RC circuit is provided. When the voltage of secondary winding S1 decreases through zero to a negative value as shown in FIG. 2(c), capacitor C2 discharges through resistor R3. However, while capacitor C2 is discharging, the voltage thereon maintains transistor T2 non-conducting for at least an additional 30 electrical degrees. In other words, capacitor C2 and resistor R3 stretch the trailing end of the positive half-cycle of voltage from that shown in FIG. 2(c) to that shown in FIG. 2(d). Consequently, when the input signal is adjusted to its minimum magnitude, this stretched voltage will maintain transistor T2 non-conducting for an additional 30 degrees whereby voltage integrating capacitor C1 will continue to charge to the extreme end of the forward voltage on controlled-rectifiers 1 before the voltage on capacitor C1 reaches a value sufficient to trigger the unijunction transistor. In this manner, by adjusting the input control voltage, the firing angle of controlled-rectifiers 1 can be adjusted anywhere from zero load current to a full 180-degree firing angle because 30 degrees is the minimum lag from the start of charging of capacitor C1 required for firing of controlled-rectifiers 1. A substantially 165-degree firing angle or approximately 97 percent of maximum load current is depicted in FIG. 2(f). As shown in FIG. 2(f), at a large value of output to the load, capacitor C1 charges to a triggering value at 75 degrees, that is, 240 minus 75 equaling a firing angle of 165 degrees. After capacitor C1 discharges and fires controlled-rectifiers 1, the latter continue to conduct for the remainder of their forward voltage period. As shown in FIG. 2(f), capacitor C1 recharges and discharges a number of times during the remainder of such 240 degree forward voltage period. However, such recharging will have no unwanted effect on controlled-rectifiers 1 as they have already been fired.

During the succeeding negative half-cycle of the voltage of transformer secondary winding S1 depicted in FIG. 2(c), capacitor C2 discharges completely as shown in FIG. 2(d). At the end of such complete discharge, the voltage reverses polarity whereby the emitter of transistor T2 is rendered positive relative to the base thereof. Thus, the current flowing through resistor R2 and transistor T1 is diverted through transistor T2 to prevent charging of capacitor C1 until 30 degrees after forward voltage is again applied to controlled-rectifiers 1 when transistor T2 again resets the charging of capacitor C1.

In a manner similar to that just described, input control voltage is applied to firing control circuits 10 and 12. Also, control voltages are applied thereto from secondary windings S2 and S3 to operate firing control circuits 10 and 12 in sequence after each operation of circuit 8. In this manner, controlled-rectifier pairs 1, 2 and 3 are fired in sequence to energize the load.

Resistor R5 in FIG. 1 provides temperature compensation and limits the wattage dissipation in unijunction transistor UT to prevent thermal runaway. Resistor R6 limits the voltage that can be applied to the gate of controlled-rectifier SCR to less than its maximum voltage rating. Since the emitter-base B1 impedance of the unijunction transistor decreases to a small value when conducting, the voltage of capacitor C1 is applied across resistors R6 and R4 [is] *in* series. These resistors function as a voltage divider to limit the maximum gate voltage of controlled-rectifier SCR.

The system shown in FIG. 1 incorporates a plurality of other features hereinbefore mentioned. The system is insensitive to electrical transients because they are averaged when capacitor C1 is charged, that is, when capacitor C1 integrates the current with respect to time flowing through input transistor T1. The application of a regulated direct current voltage supply to conductors 14 and 16 renders the system insensitive to line voltage disturbances. Capacitor C2 absorbs transients on transformer secondary winding S1 when such secondary winding voltage goes through zero value whereby such transients will not affect the starting point of charging of capacitor C1. The system provides high gain at the low power end of its adjustable range of operation. This high gain is obtained by a non-linear characteristic; that is, the charging time of capacitor C1 is inversely proportional to the value of charging current to afford a hyperbolic gain curve for a range of values of input signal voltage. The firing control circuits consume a relatively small amount of power; that is, only a little over one watt of power easily controls a 75-horsepower load when the latter is the armature winding of a direct current shunt-wound motor. Due to the connection of the primary windings of transformers PT in star relation whereby line to neutral voltage, FIG. 2(c), becomes available for controlling switching transistor T2, the system is rendered independent of supply voltage phase rotation. That is, if the three-phase power connections to lines L1, L2 and L3 are transported or reversed, this will not affect the operation of the system because the order in which controlled-rectifier pairs 1, 2 and 3 are fired is immaterial to proper functioning of the system. Regardless of which power supply phase is connected to line L1, for example, the voltage on secondary winding S1 will always be in synchronism with the forward voltage on controlled-rectifiers 1. The system can be controlled to provide constant amplitude firing pulses over a full 180 degree firing angle or control range. A 30-degree lag from the leading end of the half-cycle of voltage on secondary winding S1 to the time for developing the earliest firing pulse provides for increased linearity between controlled input and power output. The use of a pulse transformer PLT affords electrical isolation of the input signal circuits from the power supply lines and the rectifier bridge network.

If one of the series-connected controlled-rectifiers fires before the second one fires, the whole line voltage will be applied to the second controlled-rectifier. The damaging voltage transient limitations of certain controlled-rectifiers are such that they cannot withstand such voltage in the forward direction and are likely to be damaged unless they are gated. Of course, when controlled-rectifiers are gated to cause conduction, the forward anode-cathode voltage decreases to a very small value. To prevent damaging the controlled-rectifiers by excessive forward voltage, it is desirable to gate the series-connected controlled-rectifiers so that they fire simultaneously. The firing control circuits hereinbefore described have been devised to provide simultaneously occurring, very fast rise time or steep wave front pulses to the series connected controlled-rectifiers to fire the latter at the same time. Since the two firing pulses have a very fast rise time, any time lag between the firing of the two series connected controlled-rectifiers will be reduced to a minimum.

In the power circuit of the system of FIG. 1 having a three-phase rectifier bridge network RN with controlled-rectifiers 1, 2 and 3 in three legs thereof forward voltage is applied on the controlled-rectifiers in each leg for 240 electrical degrees. To provide D.C. output voltage to the load from zero to the theoretical maximum of 1.35 times the three-phase RMS value, the gating of the controlled-rectifiers must be advanced from the end of the 240 degree forward voltage period 180 degrees. When the armature winding of a direct current motor is used as the load device and a transition is made into and out of a slow-down operation, motor counter-voltage appears as a reverse voltage on the controlled-rectifiers. That is, although the line voltage is applied to the controlled-rectifiers in the forward direction, such slow-down operation causes a motor counter voltage to be applied in the reverse direction on the controlled-rectifiers which counter-voltage exceeds in magnitude the forward voltage on the controlled-rectifiers. It will be apparent that firing pulses will also be applied to the gates of the controlled-rectifiers during such reverse voltage. These firing pulses during reverse voltage substantially increase the reverse leakage currents of the controlled-rectifiers unless some means are provided to prevent this. While means to reduce reverse leakage currents have been known heretofore, these means are costly and create other problems such as greater susceptibility to electrical transients. The firing control circuits hereinbefore described have been devised to limit the firing pulses to a very narrow pulse width of about 50 micro-seconds. While such very narrow pulse width is sufficient to fire the controlled-rectifiers, it is short enough relative to time to avoid significant heating due to reverse leakage current and thereby to avoid damage to the controlled-rectifiers.

While the system hereinbefore described is effectively adapted to fulfill the objects stated, it is to be understood that I do not [intent] *intend* to confine my invention to the particular preferred embodiment of controlled-rectifier system disclosed, inasmuch as it is susceptible of various modifications without departing from the scope of the [appended claims] *invention.*

I claim:

1. In a system for controlling transfer of electrical energy from an alternating current power supply source to a load device and comprising a plurality of gating type power controlling devices in series connection between the source and the load device, the improvement comprising:

(a) means for firing the power controlling devices to render the same conducting at a selected point during periods when forward voltage is being applied thereto from said laternating current source whereby the power controlling devices thereafter conduct for the remaining portion of their forward voltage periods comprising;

(b) means comprising an electrical energy storage device for developing a linearly increasing voltage for each said forward voltage period;

(c) triggering means responsive to said linearly increasing voltage when the latter reaches a predetermined magnitude for initiating discharge current flow from said energy storage device;

(d) a very fast acting pilot device responsive to said initiation of discharge current flow from said energy storage device for causing a highly increasing value of discharge current to flow from the latter;

(e) and means responsive to said highly increasing value of discharge current flow from said energy storage device for applying simultaneous very steep wave front voltage pulses to said series-connected power controlling devices to the fire the latter simultaneously and thereby to render the same conducting at the same time.

2. In a system for controlling transfer of electrical energy from an alternating current power supply source to an inductive load device and comprising at least one gating type power controlling device between said source and the load device, the improvement comprising:

(a) means for firing the power controlling device to render it conducting at a selected point during periods when forward voltage is being applied thereto from said alternating current source whereby the power controlling device thereafter conducts current for the remaining portion of its forward voltage periods comprising;

(b) means comprising an electrical energy storage device for developing a linearly increasing voltage for each said forward voltage period;

(c) triggering means responsive to said linearly increasing voltage when the latter reaches a predetermined magnitude for initiating discharge current flow from said energy storage device;

(d) a high current conducting pilot device responsive to said initiation of discharge current flow from said energy storage device for causing very quick discharge of said energy storage device therethrough;

(e) and means responsive to the quick discharge current flow from said energy storage device for applying a voltage pulse of very short duration to said power controlling device to fire the latter and thereby to render the same conducting;

(f) means for retarding the firing point of said power controlling device on its forward voltage periods whereby the counter-voltage of the inductive load device is applied reversely to said power controlling device;

(g) and said voltage pulses having a very short duration such that they do not significantly increase the heating due to reverse leakage current of the power controlling device during application of said reverse voltage thereto.

3. The invention defined in claim 2, wherein said means for developing a linearly increasing voltage also comprises:

(a) constant current conducting semi-conductor means for controlling current flow of said energy storage device;

(b) and an adjustable input signal voltage source for operable to select the magnitude of constant current flow to said energy storage device.

4. The invention defined in claim 3, wherein said means for developing a linearly increasing voltage further comprises:

(a) means connected to said alternating current power supply source for providing an alternating current voltage wave which is synchronized with said forward voltage periods of said power controlling device;

(b) and switching means controlled by said voltage wave for causing current flow to said energy storage device only during said forward voltage periods.

5. The invention defined in claim 2, wherein said triggering means comprises:

(a) a unijunction transistor;

(b) means connected to said alternating current power supply source for developing a regulated unidirectional voltage to afford interbase voltage for said unijunction transistor;

(c) and means connecting the emitter of said unijunction transistor to said energy storage device whereby said unijunction transistor is rendered conducting when the voltage on said energy storage device reaches a predetermined magnitude.

6. The invention defined in claim 2, wherein said high current conducting pilot device comprises:

(a) a controlled-rectifier;

(b) means connecting the main current conduction path of said controlled-rectifier across said energy storage *device*;

(c) and means connecting the gate of said controlled-rectifier to said triggering means for control by the latter.

7. The invention defined in claim 6, wherein said means for applying a voltage pulse to said power controlling device comprises:

(a) a pulse transformer having a primary winding connected in series with said controlled-rectifier across said energy storage device and having a secondary winding connected to said power controlling device.

8. In a three-phase rectifier system supplied from a three-phase A.C. power supply source for energizing an inductive direct current load, said system having a three-phase rectifier bridge network connected between said source and said load and said network having a plurality of controlled-rectifiers connected in each of three like branches thereof to afford adjustable energization of the load:

(a) means for controlling firing of the controlled-rectifiers in the three branches in sequence and at a selected point during the periods when forward voltage is applied thereto from said source, said means comprising;

(b) a firing control circuit for each of said three branches of the network, each said firing control circuit comprising;

(c) means comprising a capacitor for developing a linearly increasing voltage for each said forward voltage period of the controlled-rectifiers in the associated branch;

(d) triggering means responsive to said linearly increasing voltage when it reaches a predetermined value for initiating discharge of said capacitor therethrough;

(e) means comprising a controlled-rectifier responsive to said discharge current for causing very quick discharge of said capacitor therethrough;

(f) and a pulse transformer responsive to the very quick discharge current for applying firing voltage pulses of very short duration to the controlled-rectifiers in the associated branch of the network.

9. The invention defined in claim 8, wherein forward voltage is applied in sequence to the controlled-rectifiers in the three branches for 240 electrical degree periods, and said means for developing a linearly increasing voltage for each forward voltage period of the controlled-rectifiers in the associated branch also comprises:

(a) static switching means connected across said capacitor for shunting the latter during reverse voltage periods of the controlled-rectifiers in the associated branch and for unshunting said capacitor to effect charging thereof during said forward voltage periods, said static switching means comprising:

(b) means connected to the power supply source for providing a sine voltage wave having 180 degree half-cycles synchronized with the 240 degree forward voltage periods of the controlled-rectifiers in the associated branch such that the half-cycle begins 30 degrees after and ends 30 degrees before the forward voltage period thereby to render said system insensitive to phase rotation;

(c) and a semi-conductor device responsive to said half-cycles for unshunting said capacitor.

10. The invention defined in claim 9, wherein said static switching means also comprises:

(a) means for lengthening said synchronized 180 degree half-cycles to 210 degrees whereby each such lengthened half-cycle begins 30 degrees after but ends concurrently with the forward voltage period of the controlled-rectifiers in the associated branch.

11. The invention defined in claim 10, wherein said lengthening means comprises:

(a) an RC circuit comprising a control capacitor and a resistor connected to said semi-conductor device;

(b) and a unidirectional diode allowing fast charging of said control capacitor therethrough during said synchronized half-cycles and for causing discharge of said control capacitor through said resistor during the beginning of the alternate half-cycle of said sine voltage wave whereby said semi-conductor device is maintained in its unshunting state for at least an additional 30 degrees.

12. The invention defined in claim 9, wherein said means for providing a sine voltage wave comprises:

(a) transformers having primary windings connected to said power supply source so that said sine wave control voltage for synchronizing firing pulses is in phase with line to neutral voltage.

13. The invention defined in claim 8 together with:

(a) transformers having primary windings connected in star relation such that each of three primary windings is connected between a different phase of said source and a common neutral point and secondary windings connected in delta relation;

(b) rectifier means for rectifying the voltages of said delta-connected secondary windings to provide a unidirectional voltage;

(c) voltage regulator means for affording said unidirectional voltage a constant magnitude;

(d) and means for supplying said constant unidirectional voltage to the three firing control circuits to afford regulated operating voltage for the linearly increasing voltage developing means and the triggering means therein.

14. The invention defined in claim 8, together with:

(a) an adjustable input signal voltage source connected to the three firing control circuits;

(b) and said means for developing a linearly increasing voltage in each firing control circuit also comprises a transistor controlled by said adjustable input signal voltage and being operative to control the magnitude of a constant current flow to said capacitor.

15. The invention defined in claim 14, together with:

(a) transformers having primary windings connected in star relation such that each of three primary windings is connected between a different phase of said source and a common neutral point and secondary windings connected to the respective firing control circuits;

(b) and said means for developing a linearly increasing voltage for each forward voltage period of the controlled-rectifiers in the associated branch also comprises a switching transistor connected across said capacitor;

(c) and means comprising the associated secondary winding of said transformers for applying a synchronizing control voltage to said switching transistor whereby the latter is rendered non-conducting only during the forward voltage periods of the controlled-rectifiers in the associated branch to cause charging of said capacitor and is alternately rendered conducting to shunt the current from said capacitor.

16. The invention defined in claim 15, wherein forward voltage is applied in sequence to the controlled rectifiers in the three branches for 240 electrical degree periods, and the secondary windings of the transformers provide sine wave control voltages to the respective switching transistors having 180 degree half-cycles symmetrical with the 240 degree forward voltage periods of the controlled-rectifiers in the associated branches such that the half-cycle begins 30 degrees after and ends 30 degrees before the associated forward voltage period, and said means for developing a linearly increasing voltage further comprises:

(a) a unidirectional conducting device;

(b) a control capacitor operative to charge fast through said unidirectional conducting device when said synchronized half-cycle renders said switching transistor non-conducting;

(c) and a resistor connected across said unidirectional conducting device for delaying discharge of said control capacitor for an additional 30 degrees after the transformer secondary winding voltage reverses polarity whereby to allow the voltage on the first mentioned capacitor to increase linearly to the end of the forward voltage period of the controlled-rectifiers in the associated branch.

*17. The combination comprising:*

*a three-phase controlled rectifier system supplied from a three-phase alternating current power source for adjustably energizing a load device and having a controlled rectifier in each of three like branches between the source and the load whereby the controlled rectifiers are provided with 240 electrical degree positive anode voltage periods in repetitive sequence;*

*a firing control circuit for each said controlled rectifier for developing firing current pulses;*

*means providing supply voltage to said firing control circuits;*

*means providing adjustable signal voltage to said firing control circuits to control the phase angle of said firing current pulses;*

*means for providing a cyclic control voltage having successive 180 electrical degree half-cycles of opposite polarity for each said firing control circuit to control the latter so as to synchronize the firing current pulses thereof with the 240 electrical degree positive anode voltage periods of the associated controlled rectifier, said cyclic control voltage having a phase such that alternate 180 degree half-cycles thereof start 30 degrees after and end 30 degrees before said 240 degree positive anode voltage periods of the associated controlled rectifier;*

*and means for rendering the control of said cyclic control voltage effective throughout the final 30 degrees of said 240 degree positive anode voltage periods to afford full range adjustment of the power to the load device at the lower end of such range.*

*18. The invention defined in claim 17, wherein said firing control circuit comprises:*

*means rendered effective by the portions of said cyclic control voltage associated with said 240 degree positive anode voltage periods for producing a firing current pulse whose relative phase angle is a function of said adjustable signal voltage;*

*and means responsive to the remaining portions of said cyclic control voltage of opposite polarity for rendering said firing current pulse producing means ineffective.*

*19. The invention defined in claim 18, wherein said means for rendering the control of said cyclic control voltage effective throughout said final 30 degrees comprise:*

*a circuit for stretching the trailing ends of said alternate 180 degree half-cycles a minimum of 30 degrees to provide for full range phasing of said firing current pulses comprising a unidirectional conducting device through which a capacitor is charged on one half-cycle and a resistor through which the capacitor is discharged on the alternate half-cycle.*

References Cited

The following references, cited by the Examiner, are of record in the patented file of this patent or the original patent.

UNITED STATES PATENTS

| | | | |
|---|---|---|---|
| 3,273,043 | 9/1966 | Clarke et al. | 321—18 |
| 3,099,785 | 7/1963 | Kessler et al. | 321—18 |
| 3,114,098 | 12/1963 | Rallo et al. | 321—38 XR |
| 3,133,240 | 5/1964 | Fischer | 321—38 XR |

JOHN F. COUCH, Primary Examiner

W. SHOOP, Assistant Examiner

U.S. Cl. X.R.

321—18, 47

PO-1050
(5/69)

UNITED STATES PATENT OFFICE
CERTIFICATE OF CORRECTION

Patent No. Re. 26,701 Dated October 28, 1969

Inventor(s) Robert W. Spink

It is certified that error appears in the above-identified patent and that said Letters Patent are hereby corrected as shown below:

Column 8, line 57, change "transported" to -- transposed --.

Column 9, line 71, change "laternating" to -- alternating --.

Column 10, line 61, Claim 3(b), after "for" insert -- controlling said semi-conductor means and being --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents